United States Patent Office 3,538,630
Patented Nov. 10, 1970

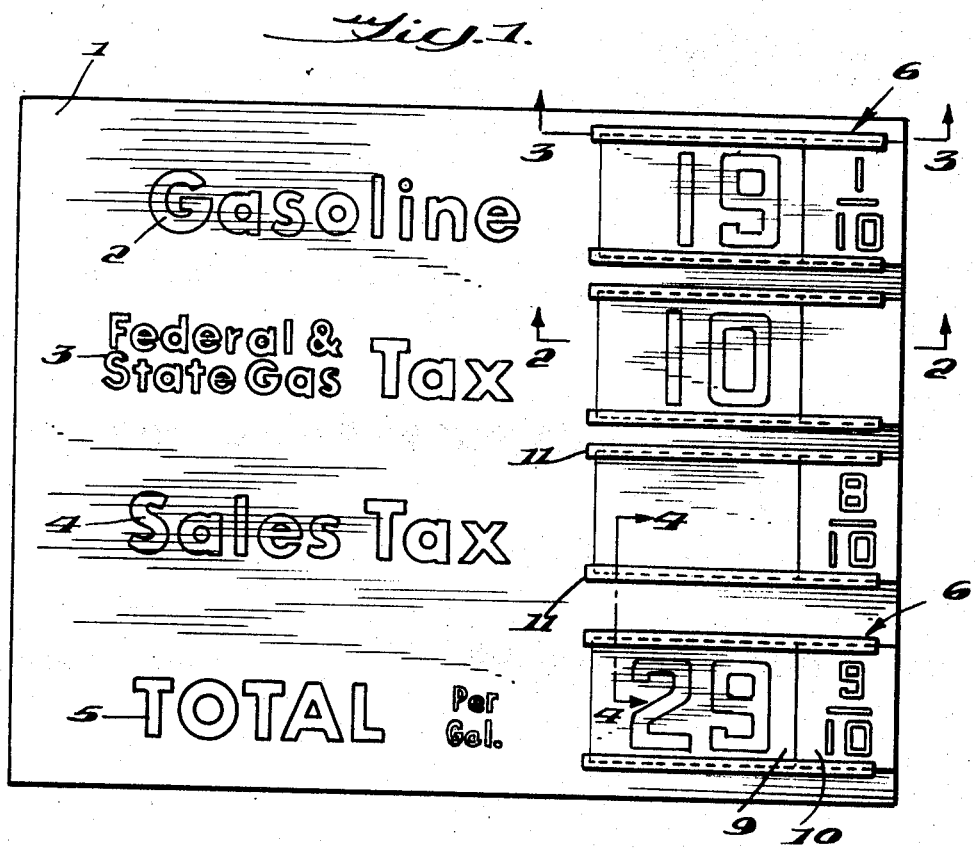
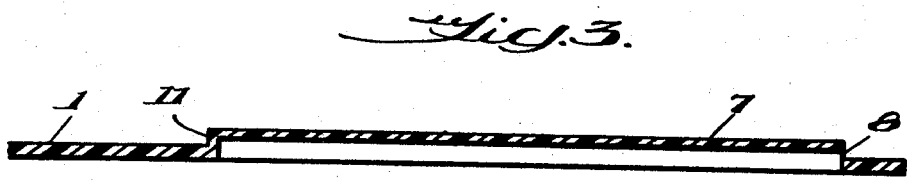
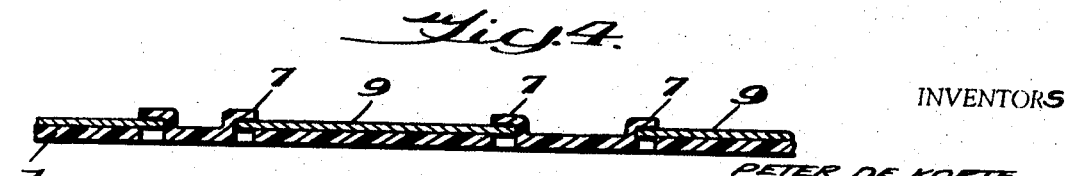

3,538,630
DISPLAY HOLDERS
Peter DeKorte, Wykoff, N.J., and Edward Ten Hoeve, Pompano Beach, Fla., assignors to Empro Products Company, Inc., Paterson, N.J., a corporation of New Jersey
Filed Mar. 7, 1968, Ser. No. 711,264
Int. Cl. G09f 3/20
U.S. Cl. 40—5
3 Claims

ABSTRACT OF THE DISCLOSURE

A display holder having one or more display cards therein, with indicia on the outer face of each card for showing the sale price of a basic commodity, such as gasoline, together with one or more items of tax applicable thereto, such as Federal and State excise tax and sales tax, as well as the total of these items. The display holder card has a plurality of separate holders mounted thereon or secured thereto so as to receive price members indicating the value of these respective items and which can be inserted and removed at one end of the display holder card, with ribs at the opposite end of each holder for limiting the insertion of the price members to maintain the vertical alignment thereof on the card.

---

The present invention relates to improvements in display holders and, more particularly, to changeable exhibitors having display cards.

In merchandising of various commodities, for example gasoline, price cards are usually employed for indicating the prices thereof and which cards are usually displayed by being mounted in a holder on the gasoline pump for ready observation. These cards have often been constructed of cardboard and it has been the practice heretofore to enclose them in transparent covers to protect them from the weather and other elements.

The price of the gasoline or other basic commodity is often printed directly on the cardboard or card together with the amount of the applicable tax which applies thereto, as well as the total price. When a change is made in the price of the basic commodity, it has been necessary to replace the entire display card.

One object of this invention is to simplify and improve the construction of the display card to enable it to be made of durable material, inexpensively, and to provide for the replaceable indication of varying prices of the basic commodity, as well as of the tax applicable thereto, in a uniform column on the face of the card.

Another object of the invention is to improve the holder for the price indicator members to enable these members to be inserted easily at an end of the display card and to be held securely in position in a uniform pattern, or to be removed therefrom.

Still another object of the invention is to provide for the display of State sales taxes, separate and apart from Federal and State excise taxes and from the basic price of the commodity, so as to inform the purchaser clearly of all items of cost involved in the total purchase price paid for the commodity.

These objects may be accomplished according to one embodiment of the invention by providing a display holder card, the body of which is constructed of a suitable formable material, such as plastic, capable of having printed thereon the name of the basic commodity, together with several items of tax. Also formed in one integral piece with the display card are holders constructed of ribs or flanges defining channels in confronting relation in position to receive therebetween price members which will indicate the price of the basic commodity and of the respective taxes applicable thereto.

This embodiment of the invention is illustrated in the accompanying drawings, in which:

FIG. 1 is a front elevation of a display holder card showing the invention applied thereto;
FIG. 2 is a detail cross section therethrough on the line 2—2 in FIG. 1;
FIG. 3 is a similar view on the line 3—3 in FIG. 1; and
FIG. 4 is a cross section on the line 4—4 in FIG. 1.

The display card shown in the drawings may be used, if desired, in a suitable holder such as is customarily mounted on a gasoline pump. An example of such a holder is set forth in Pat. No. 3,352,039, granted Nov. 14, 1967.

A display holder card is indicated generally by the numeral 1. This card 1 is preferably formed of a suitable plastic material such as a thermosetting plastic, relatively hard and moldable, and is in the form of a relatively thick flat sheet capable of being inserted in the display holder mentioned above.

Printed or otherwise provided on the outer face of the card 1 are respective lines of indicia, generally indicated at 2, 3, 4 and 5, which lines of indicia extend lengthwise of the rectangular card and are disposed in one end portion thereof, as shown in FIG. 1. The indicia 2 indicates the name of the basic commodity as, for example, gasoline. The indicia 3 indicates one type of tax as, for example, the State and Federal excise tax. The indicia 4 indicates another type of tax as, for example, the State sales tax. The indicia 5 indicates the sum of the foregoing several items.

Located in the opposite end portion of the rectangular card 1 are plurality of holders, generally indicated at 6, each of which is at an end of a line of indicia 2–5 and disposed also at the adjacent end of the card. Each of these holders 6 is preferably formed in one integral piece with the plastic body of the card 1, as will be apparent from FIGS. 2 to 4, and are adapted to receive respective price indicating members.

Each of the holders 6 comprises a pair of L-shaped flanges 7 pressed out of the plane of the flat sheet, thereby to be offset from the front face of the card 1, as shown in FIG. 4, in opposed relation defining a slideway that extends lengthwise of the card 1. This slideway is open at the end of the card, as indicated at 8 in FIG. 3, for the insertion therein of price indicating members 9 and 10.

At the opposite ends of the flanges 7, angular ribs 11 form stops or detents in the channels to limit the inward sliding movement of the members 9 and 10 and thereby to locate all of the price indicating members in vertically aligned relation, as shown in FIG. 1.

The price indicating members 9 and 10 may be formed of cardboard or other suitable stiff material which can be inserted individually into the channels. These members preferably are printed with respective indications thereon. The members 9 preferably bear whole numbers while the members 10 bear fraction numbers, as is customary in the gasoline dispensing business. Thus, a merchant may be provided with a suitable number of indicating members and select those applicable to the commodity and price thereof, which can be readily inserted or removed, as desired. By using separate indicating members for the whole numbers and fraction numbers, these are properly aligned in the holders for ready inspection and clear visibility and reading.

This provides a price sign insert or card which presents a better appearance than those in use heretofore, is inexpensive to manufacture lower in cost and sales price by reason thereof and is more practical and wider in application. It presents a better appearance and a more ready change or replacement of the prices as needed,

We claim:

1. A display holder card comprising a sheet of substantially flat rigid material having an outer face, indicia on said outer face in a plurality of separate lines of indicia describing a basic commodity and one or more items of tax applicable thereto, the material of the sheet being pressed outward from said outer face to form a plurality of pairs of L-shaped ribs on the surface thereof with each pair of ribs forming a slideway on said card at the end of each of said separate lines of indicia for receiving therein respective price members, each of the ribs being joined integral with the sheet along one lateral edge of the rib and with the opposite lateral edge offset from said outer face of the sheet in confronting relation, said ribs being open at the end of the slideway for insertion of the price member therebetween and having detent means at the opposite end thereof to stop sliding movement of the price member in the slideway, the space between the ribs at the last-mentioned end being open and unobstructed for direct relation of the line of indicia with the price member in the holder.

2. A display holder card according to claim 1, wherein the lines of tax include respective items of franchise tax and of sales tax.

3. A display holder according to claim 1, including a pair of price indicating members in side-by-side relation in each of a plurality of said slideways bearing pricing indicia thereon.

References Cited

UNITED STATES PATENTS

| | | | |
|---|---|---|---|
| 485,229 | 11/1892 | Reed | 40—63 X |
| 1,949,666 | 3/1934 | Shoemaker | 40—64 |

FOREIGN PATENTS

| | | |
|---|---|---|
| 664,182 | 6/1963 | Canada. |
| 11,894 | 5/1902 | Great Britain. |

EUGENE R. CAPOZIO, Primary Examiner

W. J. CONTRERAS, Assistant Examiner